US009639239B2

(12) United States Patent
Cai et al.

(10) Patent No.: US 9,639,239 B2
(45) Date of Patent: May 2, 2017

(54) DOCKBAR IMPLEMENTATION METHOD, DEVICE AND SYSTEM

(71) Applicant: TENCENT TECHNOLOGY (SHENZHEN) COMPANY LIMITED, Shenzhen (CN)

(72) Inventors: Yanqing Cai, Shenzhen (CN); Zhuomeng Li, Shenzhen (CN); Yong Peng, Shenzhen (CN); Jinqiu Li, Shenzhen (CN); Hongjie Liu, Shenzhen (CN); Yangfeng Ou, Shenzhen (CN); Yanbing Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 498 days.

(21) Appl. No.: 14/148,125

(22) Filed: Jan. 6, 2014

(65) Prior Publication Data

US 2014/0123054 A1 May 1, 2014

Related U.S. Application Data

(63) Continuation of application No. PCT/CN2012/077281, filed on Jun. 21, 2012.

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC ..................... G06F 17/2264; G06F 17/30289
See application file for complete search history.

(56) References Cited

U.S. PATENT DOCUMENTS 5,883,626 A * 3/1999 Glaser ................. G06F 17/2264
715/781
5,974,234 A * 10/1999 Levine .................. G06F 3/1293
358/1.16

(Continued)

FOREIGN PATENT DOCUMENTS

CN 1851641 A 10/2006
CN 1972487 A 5/2007

(Continued)

OTHER PUBLICATIONS

International Preliminary Report on Patentability from International Application No. PCT/CN2012/077281 dated Jan. 16, 2014.

(Continued)

*Primary Examiner* — William Bashore
*Assistant Examiner* — Rayeez Chowdhury
(74) *Attorney, Agent, or Firm* — Marshall, Gerstein & Borun LLP

(57) ABSTRACT

The present disclosure describes a dockbar implementation method, device and system, which belong to the field of communications. The method includes: acquiring an interface operation instruction for an application program inside a dockbar; generating a dockbar interface refresh data according to the interface operation instruction; and refreshing an interface of the dockbar according to the dockbar interface refresh data. The device includes an application layer and a logic layer. The present disclosure can realize the dynamicity of the dockbar and improve the flexibility of the dockbar.

18 Claims, 6 Drawing Sheets

(56) References Cited

U.S. PATENT DOCUMENTS

| | | | |
|---|---|---|---|
| 2003/0158945 A1* | 8/2003 | Liu | H04L 63/0815 709/227 |
| 2005/0091669 A1* | 4/2005 | Lamb | G06F 9/45537 719/328 |
| 2009/0070404 A1* | 3/2009 | Mazzaferri | G06F 9/542 709/202 |
| 2010/0313164 A1* | 12/2010 | Louch | G06F 3/0481 715/790 |
| 2011/0138295 A1* | 6/2011 | Momchilov | G06F 9/4445 715/740 |

FOREIGN PATENT DOCUMENTS

| | | |
|---|---|---|
| CN | 1992615 A | 7/2007 |
| CN | 101252550 A | 8/2008 |

OTHER PUBLICATIONS

Chinese Office Action from Application No. 2011101899285.
International Search Report for PCT/CN2012/088281 dated Sep. 27, 2012.
Yu, et al., "Totally Mastering Your Taskbar through Ten-level Modifications," Computer Tops Magazine, Feb. 2004, No. 2:30-32, ISSN 1672-7592.

* cited by examiner

DOCKBAR IMPLEMENTATION METHOD, DEVICE AND SYSTEM

This application is a continuation of International Application No. PCT/CN2012/077281, filed on Jun. 21, 2012, which claims priority to Chinese patent application No. 201110189928.5, filed on Jul. 7, 2011, the content of which are incorporated herein by reference in their entirety.

FIELD OF THE INVENTION

The present disclosure relates to the field of communications, and more particularly to a dockbar implementation method, device and system.

BACKGROUND ART

Open is an inevitable trend in the development of Internet, and open platforms based on instant messaging are also more and more widely applied. An open platform can access to a large number of third-party applications through an AppStore, and users can install their applications according to needs.

A dockbar is a start entry of the open platform, is docked at an edge of a personal desktop and also called as docked bar. The dockbar usually occupies a smaller area. When a user installs a plurality of applications in the open platform, some applications frequently used by the user can be set on the dockbar, so as to facilitate the user to open the applications.

However, dockbar in the current open platform is static, and common applications in the dockbar are pre-customized by a system. The dockbar has no dynamicity and poor flexibility.

SUMMARY

One embodiment of the present disclosure provides a dockbar implementation method, device and system, which can realize the dynamicity of a dockbar and improve the flexibility of the dockbar.

A dockbar implementation method includes:
  acquiring an interface operation instruction for an application program in a dockbar;
  generating a dockbar interface refresh data according to the interface operation instruction; and
  refreshing an interface of the dockbar according to the dockbar interface refresh data.

A dockbar implementation device includes an application layer and a logic layer; wherein
  the application layer is configured to acquire an interface operation instruction for an application program in a dockbar, send the interface operation instruction to the logic layer, and refresh an interface of the dockbar according to dockbar interface refresh data returned by the logic layer;
  the logic layer is configured to generate the dockbar interface refresh data according to the interface operation instruction sent from the application layer.

A dockbar implementation system includes a server and a dockbar implementation device; wherein
  the dockbar implementation device is configured to acquire an interface operation instruction for an application program in a dockbar, generate a dockbar interface refresh data according to the interface operation instruction and refresh an interface of the dockbar according to the dockbar interface refresh data;
  the dockbar implementation device is further configured to, when a user's login information is in a login state on an open platform, pull the user's user data and/or application list from the server, and refresh the interface of the dockbar according to the user data and/or application list;
  the server is configured to provide the user data and/or application list for the dockbar implementation device according to the login information.

The beneficial effects brought by the technical solution of embodiments of the present disclosure can include: by using an application layer to acquire an operation instruction for an application program inside a dockbar and call an interface corresponding to a logic layer, using the logic layer to accomplish processing of data information of the application program according to the operation instruction and return the processed data information to the application layer and using the application layer to refresh an interface of the dockbar accordingly, realizes the dynamicity of the dockbar and improve the flexibility of the dockbar.

DETAILED DESCRIPTION

In order to make the objectives, technical solutions and advantages of the present disclosure more clear, various embodiments of the present disclosure will be described in detail with reference to the accompanying drawings.

Embodiment One

Figure 1:
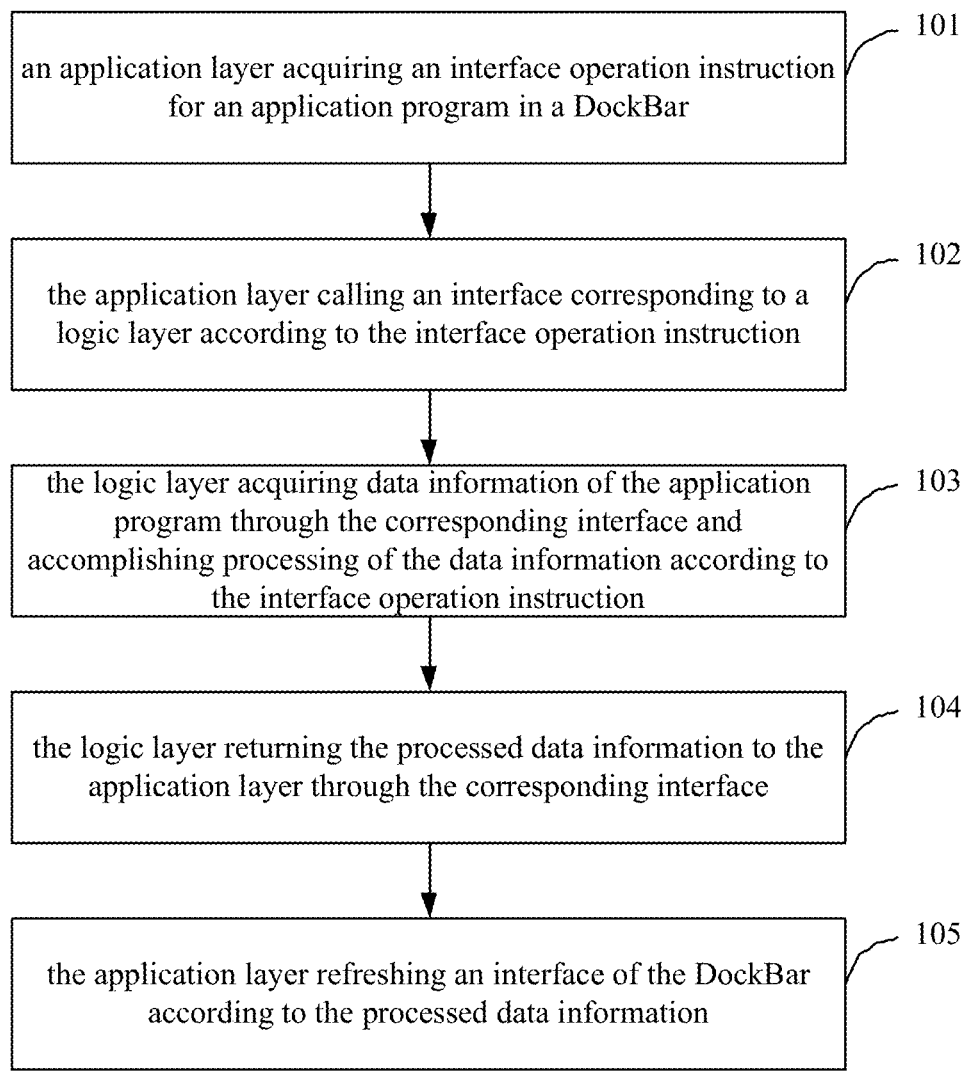
FIG. 1 is a flowchart of a dockbar implementation method provided in embodiment one of the present disclosure.

Referring to FIG. 1, one embodiment of the present disclosure provides a dockbar implementation method, which includes:
  Step 101: an application layer acquiring an interface operation instruction for an application program in a dockbar;
  Step 102: the application layer calling an interface corresponding to a logic layer according to the interface operation instruction;
  Step 103: the logic layer acquiring data information of the application program through the corresponding interface and accomplishing processing of the data information according to the interface operation instruction;
  Step 104: the logic layer returning the processed data information to the application layer through the corresponding interface;

Step 105: the application layer refreshing an interface of the dockbar according to the processed data information.

In this embodiment of the present disclosure, an open platform is an internet-based service platform, and is also a sharing platform. One user can use instant messaging login information to log in to the open platform, and can use a variety of applications shown in the open platform after a successful login. For example, the open platform can be Tencent's Q+ platform, etc., and this is not specifically limited in the embodiment of the present disclosure.

The instant messaging login information refers to login information which is used by the user to log in to instant messaging software, includes but not limited to, the user's account and passwords, etc. The instant messaging software includes several types, and can be any one of Tencent's QQ, Microsoft's MSN, Netease's POPO, Yahoo Messenger, Alitalk, ICQ, etc., and this is not specifically limited in the embodiment of the present disclosure. For example, the user can use the user's QQ account and password to log in to the open platform.

In the above method provided in the embodiment of the present disclosure, by using the application layer to acquire the interface operation instruction for the application program inside the dockbar and call the interface corresponding to the logic layer, using the logic layer to accomplish processing of data information of the application program according to the interface operation instruction and return the processed data information to the application layer, and using the application layer to refresh the interface of the dockbar accordingly, realizes the dynamicity of the dockbar and improve the flexibility of the dockbar, and can solve the problem that the existing dockbar is statically customized and has no dynamicity and poor flexibility.

In the above method provided in the embodiment of the present disclosure, the method preferably includes: when the user's instant messaging login information is in a login state on the open platform, the application layer pulling the user's user data and/or application list from a server according to the login information, then the application layer refreshing the interface of the dockbar according to the user data and/or application list. The application layer refreshing the interface of the dockbar according to the user data and/or application list can include: the application layer comparing whether user data and/or application list stored locally is consistent with the user data and/or application list pulled from the server; if the user data and/or application list stored locally is consistent with the user data and/or application list pulled from the server, refreshing the interface of the dockbar according to the user data and/or application list stored locally; if the user data and/or application list stored locally is not consistent with the user data and/or application list pulled from the server, refreshing the interface of the dockbar according to the user data and/or application list pulled from the server.

Embodiment Two

Figure 2:
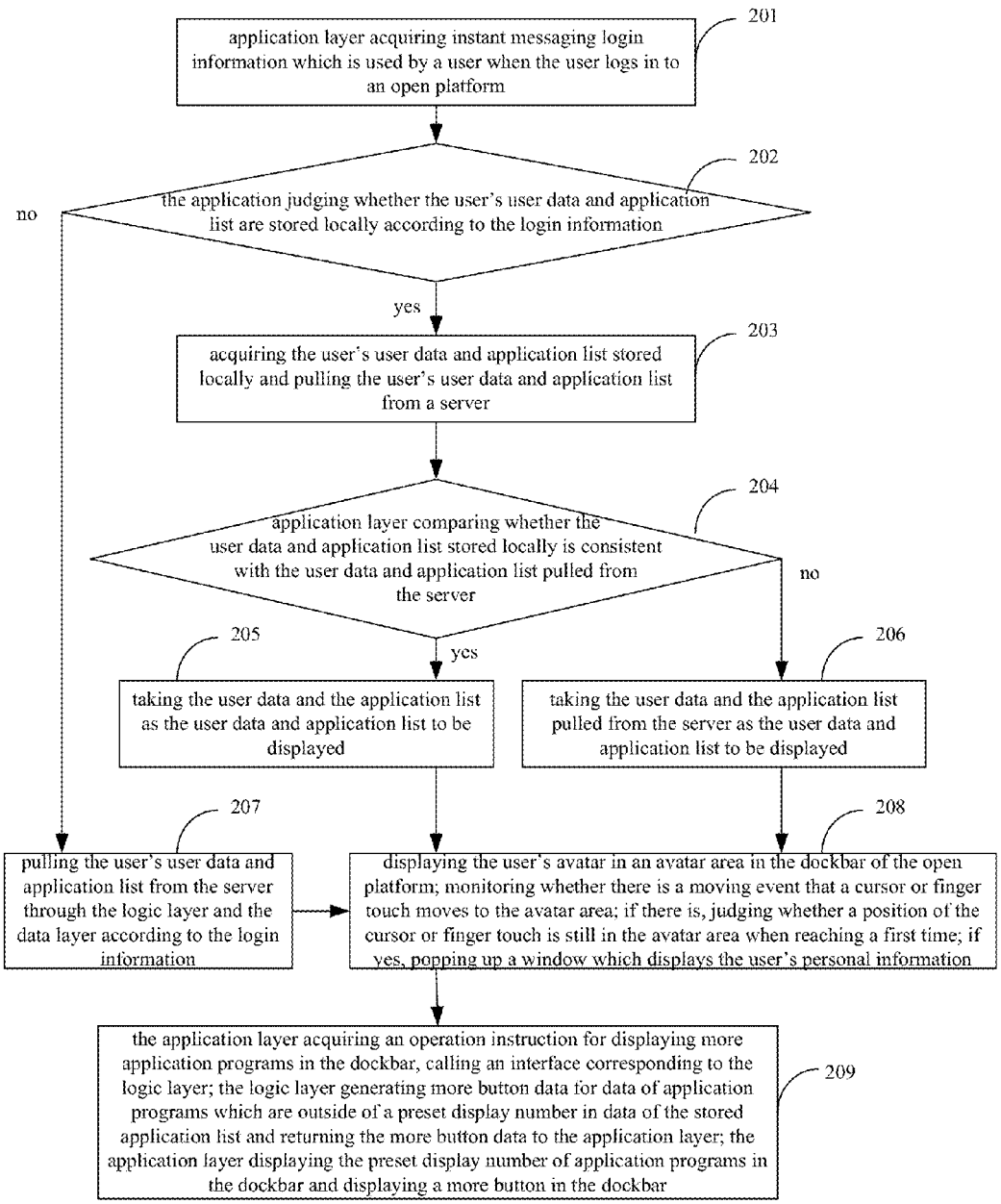
FIG. 2 is a flowchart of a dockbar implementation method provided in embodiment two of the present disclosure.

Referring to FIG. 2, one embodiment of the present disclosure provides a dockbar implementation method, which includes following steps.

Step 201: an application layer acquiring instant messaging login information which is used by a user when the user logs in to an open platform.

Step 202: the application judging whether the user's user data and application list are stored locally, according to the login information; if yes, performing step 203 and its subsequent steps; otherwise, performing step 207 and its subsequent steps.

The open platform and the instant messaging login information are the same as that described in the embodiment one, and will not be repeated here.

The user data can include user's avatar and personal information. The user's avatar refers to an image of a user avatar. The personal information refers to information which can reflect basic the user's personal situations. The personal information includes but not limited to, any one or more of the following: account, nickname, sex, age, login place, personalized signature, membership level, etc., and this is not specifically limited in the embodiment of the present disclosure.

The application list refers to a list containing all applications of the user. The user can add or delete an application in the application list according to needs.

Step 203: the application layer acquiring the user's user data and application list stored locally from a logic layer, and pulling the user's user data and application list from a server through the logic layer and a data layer according to the login information.

The server refers to a server of the instant messaging software used by the user. The server stores the user's instant messaging login information, such as account and password etc., meanwhile, also stores the user's user data and application list. When the user modifies the user data and/or application list, the server also performs corresponding updating so as to store the latest user data and application list.

Step 204: the application layer comparing whether the user data and application list stored locally is consistent with the user data and application list pulled from the server; if the user data and application list stored locally is consistent with the user data and application list pulled from the server, performing step 203 and its subsequent steps; otherwise, performing step 205 and its subsequent steps; if the user data and application list stored locally is not consistent with the user data and application list pulled from the server, performing step 206 and its subsequent steps.

The comparing refers to comparing whether the user data stored locally is consistent with the user data pulled from the server and comparing whether the application list stored locally is consistent with the application list pulled from the server, respectively.

Step 205: the application layer taking the user data and the application list as the user data and application list to be displayed, and performing step 208 and its subsequent steps.

Since the user data stored locally is consistent with the user data pulled from the server and the application list stored locally is consistent with the application list pulled from the server, thus, the user data and the application list stored locally can be taken as the user data and application list to be displayed, or the user data and application list pulled from the server can be taken as the user data and application list to be displayed.

Step 206: the application layer taking the user data and the application list pulled from the server as the user data and application list to be displayed, and performing step 208 and its subsequent steps.

Since the server stores the latest updated user data and application information while what's stored locally is just the user data and application list at a time that the user logs in the local for the last time and thus may be not the latest updated user data and application information, so, when the user data and application pulled from the server are consistent with the user data and application list stored locally, the user data and application pulled from the server shall prevail and be taken as the user data and application list to be displayed.

Step 207: the application layer pulling the user's user data and application list from the server through the logic layer and the data layer according to the login information.

Step 208: the application layer displaying the user's avatar in an avatar area in the dockbar of the open platform; monitoring whether there is a first moving event that a cursor or finger touch moves to the avatar area; if there is a first moving event that a cursor or finger touch moves to the avatar area, judging whether a position of the cursor or finger touch is still in the avatar area when reaching a preset first time; if the position of the cursor or finger touch is still in the avatar area when reaching the preset first time, popping up a window which displays the user's personal information.

In this embodiment, the user data can include the user's avatar and personal information. The dockbar of the open platform can include an avatar area and an application area. The avatar area is configured to display the user's avatar. The application area is configured to display the user's application list. The personal information can include but not limited to, the user's instant messaging account, nickname, sex, age, etc.

Further, after displaying the user's personal information in the window, the method can include:
from a beginning of displaying the user's personal information, monitoring whether there is a second moving event that the cursor or finger touch moves to the avatar area or outside of the window; if there is a second moving event that the cursor or finger touch moves to the avatar area or outside of the window, judging whether a time from the beginning of displaying the user's personal information to monitoring the second moving event is greater than or equal to a preset second time; if the time from the beginning of displaying the user's personal information to monitoring the second moving event is greater than or equal to a preset second time, hiding the window.

The preset first time and the preset second time can be set and modified according to needs, and this is not specifically limited in the embodiment of the present disclosure. For example, the first time can be set to be 800 ms, and the second time can be set to be 300 ms, etc.

The above process of popping up the window and hiding the window can specifically be as following.

When a mouse moves over the avatar area, a timer A with a time interval of t1 is started. The timer A is configured to judge whether to pop up the window which displays the user data. The timer A can avoid popping up the window which displays the user data when the user moves the mouse to the avatar area due to carelessness. When the timer A notifies arrival, if a position of the mouse is not over the avatar area, then not popping up the window which displays the user data and ending; if the position of the mouse is still over the avatar area, which indicates that it is really needed to display the user data, at this moment, popping up the window which displays the user data and starting a timer B with a time interval of t2. The timer A is configured to judge whether to hide the above window. When the timer notifies arrival, judging whether a current position of the mouse is in the avatar area or the window, if yes, not hiding the window; other wise, hiding the window.

Step 209: the application layer acquiring an interface operation instruction for an application program inside a dockbar, the interface operation instruction being to display more application programs; the application layer calling an interface corresponding to the logic layer; the logic layer generating more button data for data of application programs which are outside of a preset display number in data of the stored application list through the corresponding interface, establishing corresponding relations between the data of application programs which are outside of the preset display number and the more button data, and returning the more button data to the application layer; the application layer displaying the preset display number of application programs in the dockbar and displaying a more button in the dockbar according to the more button data, so as to pop up a window which displays the rest application programs in the application list except for the preset display number of application programs when monitoring an event of moving to the more button.

The preset display number can be set or modified according to needs, and this is not specifically limited. For example, the preset display number can be 5 or 10, etc.

Figure 3:
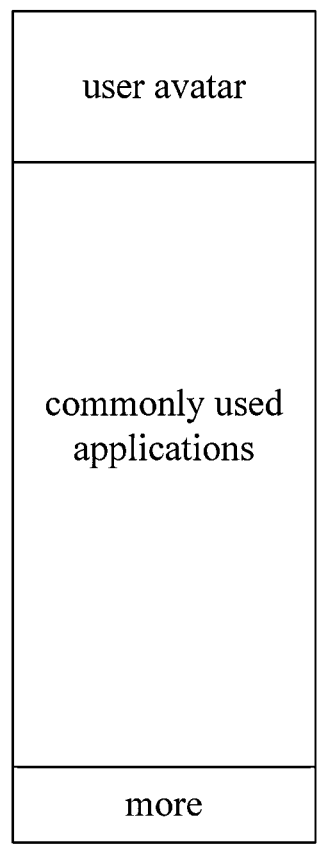
FIG. 3 is a schematic diagram of a dockbar having a more button provided in the embodiment two of the present disclosure.

Usually, the application area in the dockbar displays applications frequently used by the user. When the commonly used applications are more and cannot be placed in the application area, the more button will be displayed in the dockbar. FIG. 3 is a schematic diagram of a dockbar having the more button. When the mouse moves over the more button, a window is popped up to display other applications which cannot be placed in the application area. The logic of moving the mouse over the more button to display the window for displaying applications is consistent with the logic of moving the mouse over the avatar area to display the user's personal data, and will not be repeated here.

In this embodiment, the method can further include:
if the user starts the open platform but does not log in to the open platform, displaying a default avatar and default application provided in the open platform on the dockbar of the open platform; after the user clicks on a login button on the dockbar for login, judging whether the user's avatar is stored locally if the login is successful. Generally speaking, if the user has logged in to the open platform in the local, the user's avatar can be stored to avoid pulling the user's avatar again next time. If the user's avatar is stored locally, then it is not needed to pull the user's avatar from the server. If the user's avatar is not stored locally, the user's avatar is pulled from the server and displayed in the avatar area of the dockbar. Further, a locally stored application list can also be acquired; meanwhile, an application list is pulled from the server for comparison. Since the user may use the open platform on different computers, thus, the locally stored application list may be not consistent with the application list stored in the server; if the locally stored application list is not consistent with the application list stored in the server after comparison, the application list pulled from the server is displayed. Otherwise, the locally stored application list is displayed. Whether the user's login is successful is verified by the server.

In the above method provided in the embodiment, by using the application layer to acquire the interface operation instruction for the application program inside the dockbar and call the interface corresponding to the logic layer, using the logic layer to accomplish processing of data information of the application program according to the interface operation instruction and return the processed data information to the application layer, and using the application layer to refresh the interface of the dockbar accordingly, realizes the dynamicity of the dockbar and improve the flexibility of the dockbar, and can solve the problem that the existing dockbar is statically customized and has no dynamicity and poor flexibility. Popping up or hiding the window which displays the user data can be realized according to the movement of the mouse or finger touch, the displaying of applications which exceeds a display range of the application area can be realized through the more button, and thus functions of the dockbar can be enriched.

Embodiment Three

Figure 4:
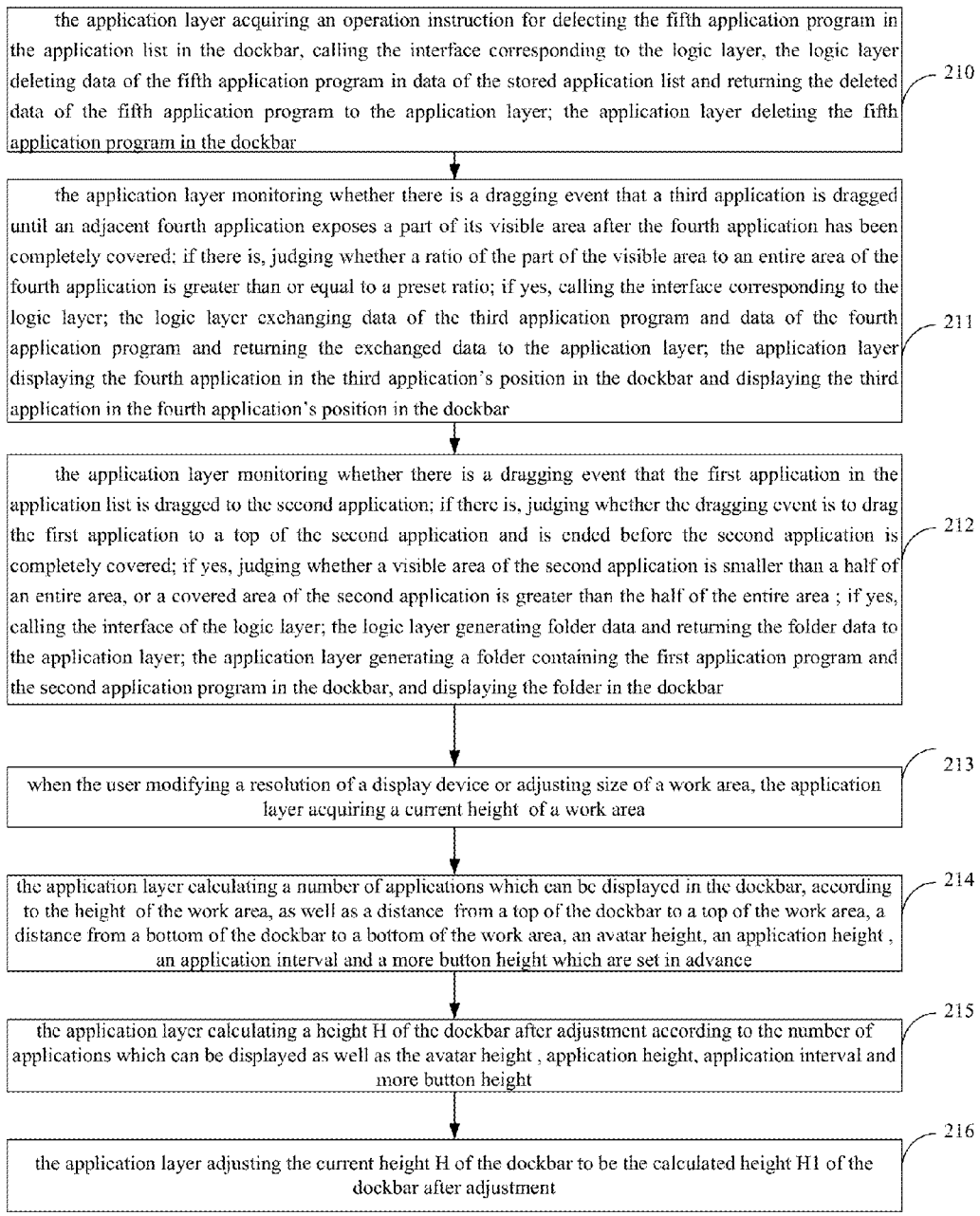
FIG. 4 is a flowchart of a dockbar implementation method provided in embodiment three of the present disclosure.

Referring to FIG. 4, one embodiment of the present disclosure also provides a dockbar implementation method, which makes improvements on the basis of the embodiment two, to facilitate the user to perform a variety of management of the applications.

In a first improvement, after step 209, the above method can further include:

Step 210: the application layer acquiring an interface operation instruction for the application program inside the dockbar, the interface operation instruction being to delete a fifth application program in the application list; the application layer calling the interface corresponding to the logic layer according to the interface operation instruction; the logic layer deleting data of the fifth application program in data of the stored application list through the corresponding interface, returning the deleted data of the fifth application program to the application layer; the application layer deleting the fifth application program in the dockbar according to the deleted data of the fifth application program.

When the user clicks on an application program displayed in the application area through a right button of the mouse, a menu is popped up for the user to view; if the user clicks on a delete option in the menu, the clicked application program is deleted from the application area.

This improvement can realize deletion of applications in the application area, and it is easy and convenient by using the right button of the mouse to realize the deletion of applications in the application area; of course, the deletion can also be realized through the finger touch, and this is not specifically limited in the embodiment of the present disclosure.

In a second improvement, after step 209, the above method can further include:

Step 211: the application layer monitoring whether there is a dragging event that a third application in the application list is dragged until an adjacent fourth application in the application list exposes a part of its visible area after the fourth application has been completely covered; if there is, judging whether a ratio of the part of the visible area to an entire area of the fourth application is greater than or equal to a preset ratio; if yes, determining that the user exchanges positions of the third application and the fourth application, calling the interface corresponding to the logic layer; the logic layer exchanging data of the third application program and data of the fourth application program in data of the stored application list, and returning the exchanged data to the application layer; the application layer displaying the fourth application in the third application's position in the dockbar and displaying the third application in the fourth application's position in the dockbar according to the exchanged data, thereby refreshing the interface of the dockbar.

The preset ratio can be set and modified according to needs, and this is not specifically limited in the embodiment. For example, the preset ratio can be 10% or 20%, etc.

This improvement can realize exchanging positions of any two adjacent applications in the application area, thereby achieving the purpose that the user can rank the applications according to needs. When the user performs above dragging operation on two non-adjacent applications in the application area, since the dragging is performed along an orientation direction of the application area and the dragging must pass all applications between the two non-adjacent applications, thus, the above process can be repeated to perform judgment for every two adjacent applications for exchanging until the mouse drags to the last application for judgment and exchanging, thereby completing the corresponding ranking process.

Figure 5:
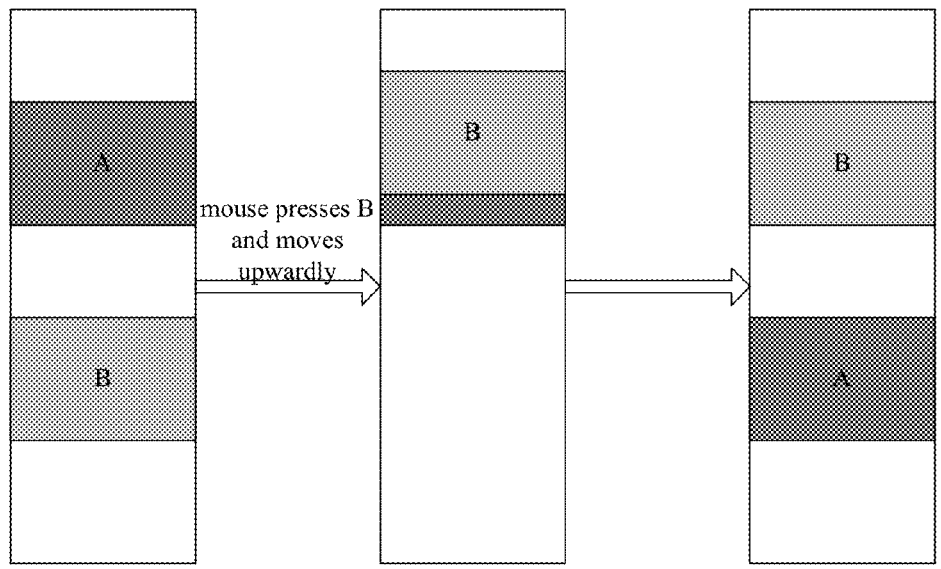
FIG. 5 is a schematic diagram of ranking applications in a dockbar provided in the embodiment three of the present disclosure.

FIG. 5 is a schematic diagram of ranking applications in the dockbar. The dockbar has two applications: an application A and an application B. When the user presses the application B via the mouse and drags the application B upwardly, after an area of the application B (RectB) has completely covered an area of the application A (RectA), the area of the application B continues to be dragged upwardly until the application A exposes its visible area again. The preset ratio can be 10%, judging whether |RectB.bottom−RectA.bottom|>=RectA.Height/10 according to coordinate values of the RectB and the RectA; if yes, exchanging positions of the application A and the application B: moving the application A to an original position of the application B and moving the application B to an original position of the application A. Of course, the application B can continue to be dragged, so as to exchange orders with other application above the application B, thereby completing the ranking process of the applications.

In a third improvement, after step 209, the above method can further include:

Step 212: the application layer monitoring whether there is a dragging event that the first application in the application list is dragged to the second application in the application list in the dockbar; if there is, judging whether the dragging event is to drag the first application to a top of the second application and is ended before the second application is completely covered; if yes, judging whether a visible area of the second application is smaller than a half of an entire area of the second application, or a covered area of the second application is greater than the half of the entire area of the second application; if yes, determining that the user merges the first application and the second application, calling the interface of the logic layer; the logic layer generating folder data in data of the stored application list through the corresponding interface, and establishing corresponding relations between the folder data and data of the first and second application programs, and returning the folder data to the application layer; the application layer generating a folder containing the first application program and the second application program in the dockbar, and displaying the folder in the dockbar.

In this improvement, one application can be dragged to another application to generate an application folder. Similarly, one application can also be dragged into an existed application folder, thus, it is convenient to classify the applications and easy to manage.

Figure 6:
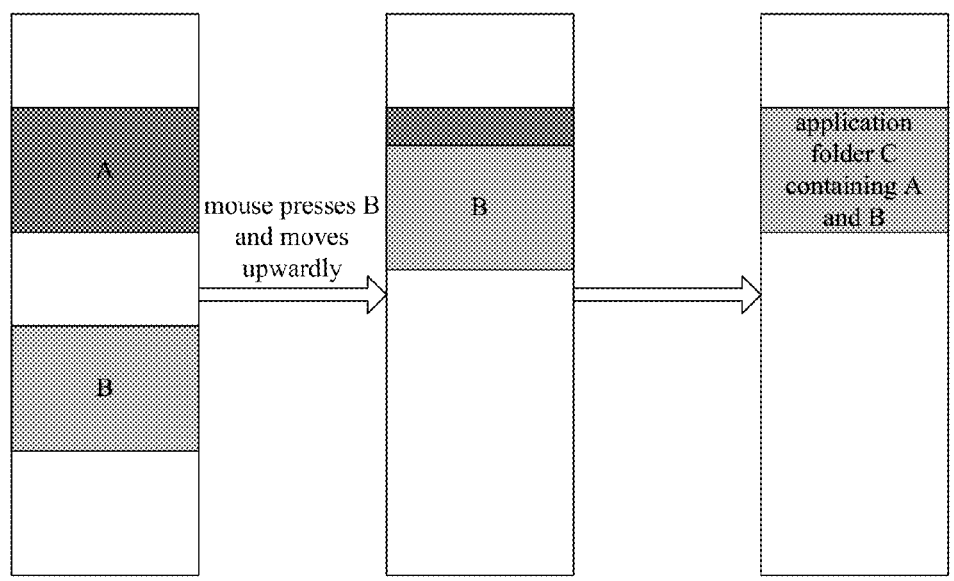
FIG. 6 is a schematic diagram of generating an application folder on the dockbar provided in the embodiment three of the present disclosure.

FIG. 6 is a schematic diagram of generating an application folder. The dockbar has two applications: an application A and an application B. The user presses the application B via the mouse and drags the application B upwardly to cover one part of the application A, and releases the mouse before the area of the application A (RectA) is completely covered by the area of the application B (RectB). Judging whether RectB.top<=(RectA.top+RectA.bottom)/2 according to coordinate values of the RectB and the RectA; if yes, generating an application folder C, placing the application A and the application B in the application folder C, and displaying the folder C in an original position of the application A. the generation of the folder C is occurred in the process of releasing the mouse.

In a fourth improvement, after step 209, the above method can further include:

Step 213: when the user modifying a resolution of a display device or adjusting size of a work area, the application layer acquiring a current height rcWorkAread.Height of a work area;

The resolution of the display device includes several types, such as 800×600, 900×600, 1024×768, 1280×720, 1280×1024 and so on. The work area refers to an area where the user currently works, and refers to an area in a screen area of a display screen except for a taskbar. The user can adjust the size of the work area by dragging the taskbar to modify size of the taskbar.

When the user modifies the resolution of the display device, Windows system sends a WM_DISPLAYCHANGE message to all Windows windows. When the user adjusts the size of his/her own work area, Windows system sends a WM_SETTINGCHANGE to windows. Thus, one window can be created to receive the two messages. When receiving the two messages, through a system function SystemParametersInfo provided in Windows, the size of the user's work area can be acquired, which specifically can be as following:

RECT rcWorkArea; SystemParametersInfo(SPI_GETWORKAREA, 0, &rcWorkArea, 0);

Step 214: the application layer calculating a number appNum of applications which can be displayed in the dockbar, according to the height rcWorkAread.Height of the work area, as well as a distance d1 from a top of the dockbar to a top of the work area, a distance d2 from a bottom of the dockbar to a bottom of the work area, an avatar height headHeight, an application height appHeight, an application interval appInter and a more button height moreHeight which are set in advance.

The distance d1 from the top of the dockbar to the top of the work area and the distance d2 from the bottom of the dockbar to the bottom of the work area can be set to be the same value, for example, at least 20 pixels, and can be 12 pixels, 15 pixels, etc. this is not specifically limited in the embodiment of the present disclosure. Units of the avatar height headHeight, application height appHeight, application interval appInter and more button height moreHeight are pixels. The application interval appInter refers to a distance between any two adjacent applications. The plurality of applications in the dockbar are arranged with an equal interval.

Specifically, the number appNum of applications which can be displayed in the dockbar can be calculated according to following formulas:

appNum=(rcWorkAread.Height−headHeight−moreHeight−d1−d2)/(appHeight+appInter).

If a calculation result of the appNum is a decimal, a rounded down processing can be performed.

Step 215: the application layer calculating a height H of the dockbar after adjustment according to the number appNum of applications which can be displayed as well as the avatar height headHeight, application height appHeight, application interval appInter and more button height moreHeight;

Specifically, the height H of the dockbar after adjustment can be calculated according to following formulas:

1) if there is a more button in the dockbar, then the calculation formula can be:

headHeight+moreHeight+appNum*appHeight+(appNum−1)*appInter;

2) if there is not a more button in the dockbar, then the calculation formula can be:

headHeight+appNum*appHeight+(appNum−1)*appInter;

Step 216: the application layer adjusting the current height H of the dockbar to be the calculated height H of the dockbar after adjustment.

For example, the user adjusts the resolution of the display device to be 1280*1024, and a height of a taskbar on a screen is 100 pixels, then obtaining rcWorkAread.Height=924 pixels. Presetting d1=d2=10 pixels, avatar height headHeight=62 pixels, more button height moreHeight=20 pixels, appHeight=52 pixels, appInter=4 pixels, then it can be calculated that the number of applications which can be displayed in the dockbar is appNum=14, and it can be further calculated that the height of the dockbar after adjustment is H1=862 pixels, thus, the application layer can adjust a current height of the dockbar to be 862 pixels.

This improvement can realize high adaptation of the dockbar, and can avoid the situation that a fixed height of the dockbar may cause the displaying of the dockbar incomplete. Since a width of the dockbar is usually smaller, for example 62 pixels, thus, it is not needed to consider width adaptation of the dockbar.

This embodiment can make any one or more of the above four improvements on the basis of the embodiment two, and this is not specifically limited in this embodiment of the present disclosure.

In the above method provided in the embodiment, by acquiring instant messaging login information which is used by a user when the user logs in to an open platform, acquiring the user's user data and application list according to the login information and displaying the acquired user data and application list in the dockbar of the open platform, realizes the dynamicity of the dockbar and improve the flexibility of the dockbar, and can solve the problem that the existing dockbar is statically customized and has no dynamicity and poor flexibility. Exchanging positions of any two adjacent applications in the application area can be realized by dragging, thereby achieving the purpose that the user can rank the applications according to needs. Further, dragging one application to another application to generate an application folder can also be realized, thus, it is convenient to classify the applications and easy to manage. In addition, the height of the dockbar being adaptive according to the resolution of the display device or the work area can be realized through calculation, thereby avoiding the situation that the fixed height of the dockbar may cause the displaying of the dockbar incomplete, and thus the functions of the dockbar can be enriched.

Embodiment Four

Figure 7:
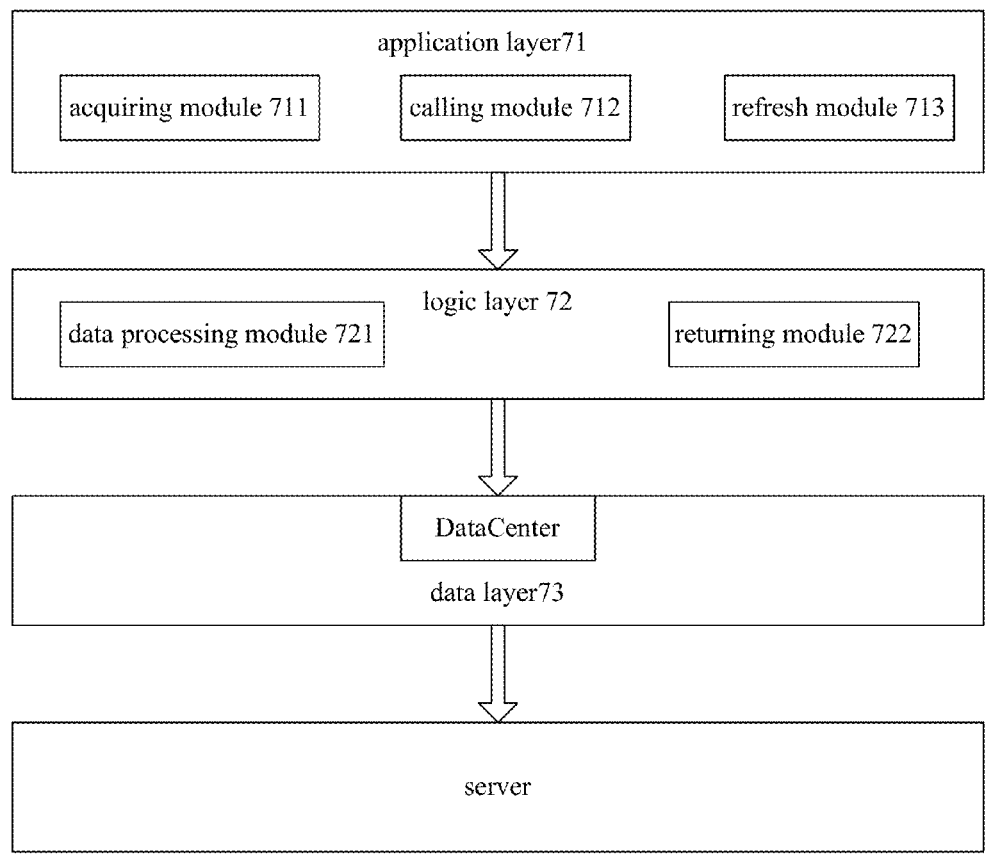
FIG. 7 is a flowchart of a dockbar implementation device provided in embodiment four of the present disclosure.

Referring to FIG. 7, one embodiment of the present disclosure also provides a dockbar implementation device, which includes an application layer 71 and a logic layer 72.

The application layer 71 is configured to, when a user's instant messaging login information is in a login state on an open platform, acquire an interface operation instruction for an application program in a dockbar, call an interface corresponding to a logic layer according to the interface operation instruction, receive data information returned by the logic layer, and refresh an interface of the dockbar according to the data information;

The logic layer 72 is configured to acquire data information of the application program through the corresponding interface, process the data information of the application program and return the processed data information to the application layer 71.

In this embodiment, the application layer 71 can include:
  an acquiring module 711, configured to acquire the interface operation instruction for the application program in the dockbar;
  a calling module 712, configured to call the interface corresponding to the logic layer according to the interface operation instruction;
  a refresh module 713 configured to refresh the interface of the dockbar according to the data information processed by the logic layer.

The logic layer 72 can include:
  a data processing module 721 configured to acquire the data information of the application program through the corresponding interface and accomplish processing of the data information of the application program according to the interface operation instruction;
  a returning module 722 configured to return the processed data information to the application layer 71 through the corresponding interface.

Preferably, the application layer 71 is further configured to, when the user's instant messaging login information is in the login state on the open platform, pull the user's user data and/or application list from a server according to the login information, and refresh the interface of the dockbar according to the user data and/or application list.

More specifically, the application layer 71 is configured to compare whether user data and/or application list stored locally is consistent with the user data and/or application list pulled from the server; if the user data and/or application list stored locally is consistent with the user data and/or application list pulled from the server, refresh the interface of the dockbar according to the user data and/or application list stored locally; if the user data and/or application list stored locally is not consistent with the user data and/or application list pulled from the server, refresh the interface of the dockbar according to the user data and/or application list pulled from the server.

The interface operation instruction can be to generate a folder for a first application program and a second application program; accordingly,
  the data processing module 721 is configured to generate folder data in data of a stored application list through the corresponding interface, and establish corresponding relations between the folder data and data of the first and second application programs;
  the refresh module 713 is configured to generate a folder containing the first application program and the second application program in the dockbar, and display the folder in the dockbar.

The interface operation instruction can be to exchange a third application program and a fourth application program;
  the data processing module 721 is configured to exchange data of the third application program and data of the fourth application program in data of the stored application list;
  the refresh module 713 is configured to display the fourth application in the third application's position in the dockbar and display the third application in the fourth application's position in the dockbar according to the exchanged data of the third application program and the fourth application program.

The interface operation instruction can be to delete a fifth application program;
  the data processing module 721 is configured to delete data of the fifth application program in data of the stored application list;
  the refresh module 713 is configured to delete the fifth application in the dockbar according to the deleted data of the fifth application program.

Further, the application layer 71 can also include an adaptation module 714,
  the adaptation module 714 is configured to, when the user modifies a resolution of a display device or adjusts size of a work area, acquire a current height of a work area; calculate a number of applications which can be displayed in the dockbar, according to the height of the work area, as well as a distance from a top of the dockbar to a top of the work area, a distance from a bottom of the dockbar to a bottom of the work area, an avatar height, an application height, an application interval and a more button height which are set in advance; calculate a height of the dockbar after adjustment according to the number of applications which can be displayed as well as the avatar height, application height, application interval and more button height;
  the refresh module 713 is also configured to adjust the height of the dockbar to be the calculated height of the dockbar after adjustment.

The interface operation instruction can be to display more application programs.

The data processing module 721 is configured to generate more button data in data of the stored application list for data of application programs which are outside of a preset display number through the corresponding interface, and establish corresponding relations between the data of application programs which are outside of the preset display number and the more button data;
  the refresh module 713 is configured to display the preset display number of application programs in the dockbar and display a more button in the dockbar according to the more button data, so as to pop up a window which displays the rest application programs in the application list except for the preset display number of application programs when monitoring an event of moving to the more button.

Referring to FIG. 7, the device further includes a data layer 73 configured to communicate with the server.

The application layer 71 is responsible for displaying the user's avatar in an avatar area HeadImageArea of the dockbar, displaying the application list in an application area FavAppArea of the dockbar and operating the applications displayed in the dockbar. The logic layer 72 is responsible for forwarding a request of the application layer to the data layer, parsing the data returned from the data layer and notifying the application layer to display. When the user does not log in to the open platform, the application layer acquires a default avatar and default application provided in the open platform through the logic layer. When the user logs in to the open platform, through the logic layer, the application layer acquires the user's avatar and application set by the user which includes acquiring the user data and application list stored locally as well as pulling the user data and application list from the server. The operations for commonly used applications, such as deleting, moving and merging two applications into one folder etc., are operated by the logic layer. The data layer 73 communicates with the server to acquire the user data and application list from the server. The user can manage the applications in the dockbar, and the managed data is stored in the server through the data layer.

Based on FIG. 7, one embodiment of the present disclosure further provides a dockbar implementation system.

The system includes a server and a dockbar implementation device.

The dockbar implementation device is configured to acquire an interface operation instruction for an application program in a dockbar, generate a dockbar interface refresh data according to the interface operation instruction and refresh an interface of the dockbar according to the dockbar interface refresh data.

The dockbar implementation device is further configured to, when a user's instant messaging login information is in a login state on an open platform, pull the user's user data and/or application list from the server, and refresh the interface of the dockbar according to the user data and/or application list.

The server is configured to provide the user data and/or application list for the dockbar implementation device according to the login information.

In one embodiment, the dockbar implementation device is configured to compare whether user data and/or application list stored locally is consistent with the user data and/or application list pulled from the server; if the user data and/or application list stored locally is consistent with the user data and/or application list pulled from the server, refresh the interface of the dockbar according to the user data and/or application list stored locally; if the user data and/or application list stored locally is not consistent with the user data and/or application list pulled from the server, refresh the interface of the dockbar according to the user data and/or application list pulled from the server.

Specifically, the open platform can be an application open platform, a search open platform, a micblogging open platform, a game open platform, a blog open platform or an online support platform, etc.

Preferably, the user's login information in the login state on the open platform refers to that the user's instant messaging login information is in the login state on the open platform.

In the above method, device and system provided in the embodiments, by acquiring instant messaging login information which is used by the user when the user logs in to the open platform, acquiring the user's user data and application list according to the login information and displaying the acquired user data and application list in the dockbar of the open platform, realizes the dynamicity of the dockbar and improve the flexibility of the dockbar, and can solve the problem that the existing dockbar is statically customized and has no dynamicity and poor flexibility. Exchanging positions of any two adjacent applications in the application area can be realized by dragging, thereby achieving the purpose that the user can rank the applications according to needs. Further, dragging one application to another application to generate an application folder can also be realized, thus, it is convenient to classify the applications and easy to manage. In addition, the height of the dockbar being adaptive according to the resolution of the display device or the work area can be realized through calculation, thereby avoiding the situation that the fixed height of the dockbar may cause the displaying of the dockbar incomplete, and thus the functions of the dockbar can be enriched.

One skilled in the art can understand that realization of the whole or parts of the steps in the above embodiments can be accomplished by hardware, or by a program instructing relevant hardware. The program may be stored in a computer readable storage medium, the above mentioned storage medium may be a read-only memory, magnetic or optical disk, etc.

The foregoing are only preferred embodiments of the present disclosure, and are not used to limit the present disclosure. Any modification, equivalent replacement, or improvement made without departing from the spirit and principle of the present disclosure should fall within the scope of the present disclosure.

The invention claimed is:

1. A dockbar implementation method comprising:
   acquiring an interface operation instruction for an application program in a dockbar;
   generating a dockbar interface refresh data according to the interface operation instruction; and
   refreshing an interface of the dockbar according to the dockbar interface refresh data;
   and further comprising: when modifying a resolution of a display device or adjusting size of a work area, acquiring a current height of a work area;
   calculating a number of applications which are able to be displayed in the dockbar, according to the height of the work area as well as a distance from a top of the dockbar to a top of the work area, a distance from a bottom of the dockbar to a bottom of the work area, an avatar height, an application height, an application interval and a more button height which are set in advance;
   calculating a height of the dockbar after adjustment according to the number of applications which are able to be displayed as well as the avatar height, the application height, the application interval and the more button height;
   adjusting the height of the dockbar to be the calculated height of the dockbar after adjustment.

2. The method of claim 1, wherein the interface operation instruction is to generate a folder for a first application program and a second application program in the dockbar; the generating a dockbar interface refresh data according to the interface operation instruction comprises:
   generating folder data in data of a stored application list, and establishing corresponding relations between the folder data and data of the first and second application programs;
   accordingly, the refreshing an interface of the dockbar according to the dockbar interface refresh data comprises:
   generating a folder containing the first application program and the second application program in the dockbar, and displaying the folder in the dockbar.

3. The method of claim 1, wherein the interface operation instruction is to exchange and display a third application program and a fourth application program in the dockbar; the generating a dockbar interface refresh data according to the interface operation instruction comprises:
   exchanging data of the third application program and data of the fourth application program in data of a stored application list;
   accordingly, the refreshing an interface of the dockbar according to the dockbar interface refresh data comprises:
   displaying the fourth application program in the third application program's position in the dockbar and displaying the third application program in the fourth application program's position in the dockbar according to the exchanged data of the third application program and the fourth application program.

4. The method of claim 1, wherein the interface operation instruction is to delete a fifth application program in the dockbar; the generating a dockbar interface refresh data according to the interface operation instruction comprises:
deleting data of the fifth application program in data of a stored application list;
accordingly, the refreshing an interface of the dockbar according to the dockbar interface refresh data comprises:
deleting the fifth application program in the dockbar according to the deleted data of the fifth application program in the application list data.

5. The method of claim 1, wherein the interface operation instruction is to display more application programs in the dockbar; the generating a dockbar interface refresh data according to the interface operation instruction comprises:
generating more button data in data of a stored application list for data of application programs which are outside of a preset display number, and establishing corresponding relations between the data of the application programs which are outside of the preset display number and the more button data;
accordingly, the refreshing an interface of the dockbar according to the dockbar interface refresh data comprises:
displaying the preset display number of application programs in the dockbar and displaying a more button in the dockbar according to the more button data, to pop up a window which displays the rest application programs in the application list except for the preset display number of application programs when monitoring an event of moving to the more button.

6. The method of claim 1, further comprising:
when a user's login information is in a login state on an open platform, pulling the user's user data and/or application list from a server according to the user's login information;
refreshing the interface of the dockbar according to the user data and/or application list.

7. The method of claim 6, wherein the refreshing the interface of the dockbar according to the user data and/or application list comprises:
comparing whether user data and/or application list stored locally is consistent with the user data and/or application list pulled from the server; if the user data and/or application list stored locally is consistent with the user data and/or application list pulled from the server, refreshing the interface of the dockbar according to the user data and/or application list stored locally; if the user data and/or application list stored locally is not consistent with the user data and/or application list pulled from the server, refreshing the interface of the dockbar according to the user data and/or application list pulled from the server.

8. The method of claim 6, wherein the user's login information in the login state on the open platform is that the user's instant messaging login information is in the login state on the open platform.

9. A dockbar implementation device comprising a processor, an application program layer and a logic layer; wherein
the application program layer is configured to acquire an interface operation instruction for an application program in a dockbar, send the interface operation instruction to the logic layer, and refresh an interface of the dockbar according to dockbar interface refresh data returned by the logic layer; and
the logic layer is configured to generate the dockbar interface refresh data according to the interface operation instruction sent from the application program layer;
wherein the application program layer is further configured to:
when a user modifies a resolution of a display device or adjusts size of a work area, acquire a current height of a work area; calculate a number of applications which are able to be displayed in the dockbar according to the height of the work area as well as a distance from a top of the dockbar to a top of the work area, a distance from a bottom of the dockbar to a bottom of the work area, an avatar height, an application height, an application interval and a more button height which are set in advance; calculate a height of the dockbar after adjustment according to the number of applications which are able to be displayed as well as the avatar height, the application height, the application interval and the more button height; and adjust the height of the dockbar to be the calculated height of the dockbar after adjustment.

10. The device of claim 9, wherein the application program layer comprises:
an acquiring module configured to acquire the interface operation instruction for the application program in the dockbar;
a calling module configured to call an interface corresponding to the logic layer according to the interface operation instruction and send the interface operation instruction to the logic layer through the corresponding interface;
a refresh module configured to refresh the interface of the dockbar according to the dockbar interface refresh data returned by the logic layer;
the logic layer comprises:
a data processing module configured to acquire the interface operation instruction through the corresponding interface and generate the dockbar interface refresh data according to the interface operation instruction; and
a returning module configured to return the dockbar interface refresh data to the application through the corresponding interface.

11. The device of claim 9, wherein the interface operation instruction is to generate a folder for a first application program and a second application program in the dockbar;
the data processing module is configured to generate folder data in data of a stored application list, and establish corresponding relations between the folder data and data of the first and second application programs; and
the refresh module is configured to generate a folder containing the first application program and the second application program in the dockbar, according to the folder data and display the folder in the dockbar.

12. The device of claim 9, wherein the interface operation instruction is to exchange and display a third application program and a fourth application program in the dockbar;
the data processing module is configured to exchange data of the third application program and data of the fourth application program in data of a stored application list; and the refresh module is configured to display the fourth application program in the third application program's position in the dockbar and display the third application program in the fourth application program's position in the dockbar according to the exchanged data of the third application program and the fourth application program.

13. The device of claim 9, wherein the interface operation instruction is to delete a fifth application program in the dockbar;
the data processing module is configured to delete data of the fifth application program in data of a stored application list; and
the refresh module is configured to delete the fifth application program in the dockbar according to the deleted data of the fifth application program.

14. The device of claim 9, wherein the interface operation instruction is to display more application programs;
the data processing module is configured to generate more button data in data of a stored application list for data of application programs which are outside of a preset display number, and establish corresponding relations between the data of application programs which are outside of the preset display number and the more button data; and
the refresh module is configured to display the preset display number of application programs in the dockbar and display a more button in the dockbar according to the more button data, so as to pop up a window which displays the rest application programs in the application list except for the preset display number of application programs when monitoring an event of moving to the more button.

15. The device of claim 9, wherein
the application program layer is configured to, when a user's login information is in a login state on an open platform, pull the user's user data and/or application list from a server according to the login information and refresh the interface of the dockbar according to the user data and/or application list.

16. The device of claim 15, wherein
the application program layer is configured to, compare whether user data and/or application list stored locally is consistent with the user data and/or application list pulled from the server; if the user data and/or application list stored locally is consistent with the user data and/or application list pulled from the server, refresh the interface of the dockbar according to the user data and/or application list stored locally; if the user data and/or application list stored locally is not consistent with the user data and/or application list pulled from the server, refresh the interface of the dockbar according to the user data and/or application list pulled from the server.

17. A dockbar implementation system comprising at least one processor, a server, and a dockbar implementation device; wherein
the dockbar implementation device is configured to acquire an interface operation instruction for an application program in a dockbar, generate a dockbar interface refresh data according to the interface operation instruction and refresh an interface of the dockbar according to the dockbar interface refresh data;
the dockbar implementation device is further configured to, when a user's login information is in a login state on an open platform, pull the user's user data and/or application list from the server, and refresh the interface of the dockbar according to the user data and/or application list;
the dockbar implementation device is further configured to, when a user modifies a resolution of a display device or adjusts size of a work area, acquire a current height of a work area;
calculate a number of applications which are able to be displayed in the dockbar according to the height of the work area as well as a distance from a top of the dockbar to a top of the work area, a distance from a bottom of the dockbar to a bottom of the work area, an avatar height, an application height, an application interval and a more button height which are set in advance; calculate a height of the dockbar after adjustment according to the number of applications which are able to be displayed as well as the avatar height, the application height, the application interval and the more button height; and adjust the height of the dockbar to be the calculated height of the dockbar after adjustment; and
the server is configured to provide the user data and/or application list for the dockbar implementation device according to the login information.

18. The system of claim 17, wherein,
the dockbar implementation device is configured to,
compare whether user data and/or application list stored locally is consistent with the user data and/or application list pulled from the server; if the user data and/or application list stored locally is consistent with the user data and/or application list pulled from the server, refresh the interface of the dockbar according to the user data and/or application list stored locally; if the user data and/or application list stored locally is not consistent with the user data and/or application list pulled from the server, refresh the interface of the dockbar according to the user data and/or application list pulled from the server.

* * * * *